US008058379B2

(12) United States Patent
Yasuda et al.

(10) Patent No.: US 8,058,379 B2
(45) Date of Patent: Nov. 15, 2011

(54) 4-METHYL-1-PENTENE POLYMER, PROCESS FOR PRODUCING THE SAME AND USE THEREOF

(75) Inventors: Kazuaki Yasuda, Ichihara (JP); Tooru Tanaka, Yokohama (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 21 days.

(21) Appl. No.: 12/668,331

(22) PCT Filed: Jul. 7, 2008

(86) PCT No.: PCT/JP2008/062287
§ 371 (c)(1),
(2), (4) Date: Jan. 8, 2010

(87) PCT Pub. No.: WO2009/008409
PCT Pub. Date: Jan. 15, 2009

(65) Prior Publication Data
US 2010/0179295 A1    Jul. 15, 2010

(30) Foreign Application Priority Data

Jul. 10, 2007 (JP) .................................. 2007-180921

(51) Int. Cl.
*C08F 10/14* (2006.01)
*C08F 4/654* (2006.01)

(52) U.S. Cl. .................. 526/348.4; 526/348; 526/348.1; 526/348.2; 526/348.3; 526/348.6; 526/124.9

(58) Field of Classification Search .................. 526/348, 526/348.1, 348.2, 348.3, 348.4, 348.5, 348.6
See application file for complete search history.

(56) References Cited

U.S. PATENT DOCUMENTS

| | | | | |
|---|---|---|---|---|
| 3,969,335 | A | * | 7/1976 | Nickl et al. .................. 526/159 |
| 4,525,469 | A | | 6/1985 | Ueda et al. |
| 4,668,752 | A | | 5/1987 | Tominari et al. |
| 2007/0249792 | A1 | | 10/2007 | Kawahara et al. |
| 2008/0004412 | A1 | | 1/2008 | Matsumoto et al. |

FOREIGN PATENT DOCUMENTS

| | | |
|---|---|---|
| EP | 1 775 320 A1 | 4/2007 |
| EP | 1 816 146 A1 | 8/2007 |
| JP | 59-075908 A | 4/1984 |
| JP | 59-075910 A | 4/1984 |
| JP | 60-088016 A | 5/1985 |
| JP | 60-104102 A | 6/1985 |
| JP | 2005-089663 A | 4/2005 |
| WO | WO 2005-121192 A1 | 12/2005 |
| WO | WO 2006-054613 A1 | 5/2006 |
| WO | WO 2006/109631 A1 | 10/2006 |

OTHER PUBLICATIONS

*International Search Report (PCT/ISA/210) for PCT/JP2008/062287 mailed Oct. 7, 2008.
Extended Search Report from European Patent Office issued in corresponding European Patent application No. 08777949.2 dated Dec. 15, 2010.

* cited by examiner

*Primary Examiner* — Roberto Rabago
(74) *Attorney, Agent, or Firm* — Buchanan Ingersoll & Rooney PC (57) ABSTRACT

The present invention provides a 4-methyl-1-pentene polymer having excellent balance between heat resistance and rigidity, a process for producing the polymer, and a film and a LED mold formed from the polymer. The 4-methyl-1-pentene polymer comprises 50 to 100% by mass of a constituting unit derived from 4-methyl-1-pentene and 0 to 50% by mass of a constituting unit derived from at least one of olefins having 2 to 20 carbon atoms excluding 4-methyl-1-pentene, wherein the 4-methyl-1-pentene polymer is obtainable by continuously feeding a monomer forming the 4-methyl-1-pentene polymer and an organic solvent to a polymerization reactor and continuously extracting a polymerization reaction mixture containing the resulting 4-methyl-1-pentene polymer from the polymerization reactor.

9 Claims, 1 Drawing Sheet

4-METHYL-1-PENTENE POLYMER, PROCESS FOR PRODUCING THE SAME AND USE THEREOF

TECHNICAL FIELD

The present invention relates to a 4-methyl-1-pentene polymer having excellent balance between heat resistance and rigidity, a process for producing the polymer and uses thereof.

TECHNICAL BACKGROUND

Since olefin polymers have excellent processability, chemical resistance and electrical and mechanical properties, they are molded into extrusion molded articles, injection molded articles, hollow molded articles, films, sheets and the like and have been applied to a wide range of uses, for example, convenience goods, kitchen utensils, packaging films, fibers such as non-woven fabrics, etc, household electric appliances, mechanical parts, electric parts, automobile parts and the like. In particular, olefin polymers containing 4-methyl-1-pentene have been used as a resin having excellent heat resistance together with excellent transparency, gas permeability and chemical resistance in various fields, for example, medical instruments, heat resistant electric wires, heat resistant dishes and the like.

Patent documents 1 and 2 disclose a catalyst, which comprises a solid titanium catalyst component composed of magnesium, titanium, halogen and an electron donor, and an organometal compound as a catalyst for polymerization of olefins containing 4-methyl-1-pentene. These patent documents also disclose a process for producing a 4-methyl-1-pentene polymer by a Batch polymerization method using the above-described catalyst. The resulting polymers prepared by these processes sometimes have inferior heat resistance for their rigidity depending to uses.

Recently, as a catalyst for polymerization of olefin polymers containing 4-methyl-1-pentene, a metallocene catalyst has been disclosed (referred to Patent document 3). This patent document also discloses a process for producing an olefin polymer containing 4-methyl-1-pentene by a Batch polymerization method. However, the resulting polymer sometimes has still insufficient balance between heat resistance and rigidity. Therefore, the improvement in the polymers and polymerization methods has been desired.

Patent document 1: JP-A-2005-89663
Patent document 2: International publication WO-2006-054613
Patent document 3: International publication WO-2005-121192

DISCLOSURE OF INVENTION

Object of the Invention

The present invention is intended to solve the problems, and it is an object of the present invention to provide a 4-methyl-1-pentene polymer having excellent balance between heat resistance and rigidity, a process for producing the polymer and uses thereof.

Means for Solving Problem

The 4-methyl-1-pentene polymer of the present invention comprises:
50 to 100% by mass of a constituting unit derived from 4-methyl-1-pentene and 0 to 50% by mass of a constituting unit derived from at least one of olefins having 2 to 20 carbon atoms excluding 4-methyl-1-pentene provided that the total of the constituting unit derived from 4-methyl-1-pentene and the constituting unit derived from at least one of olefins having 2 to 20 carbon atoms excluding 4-methyl-1-pentene is 100% by mass, and the 4-methyl-1-pentene polymer is obtainable by feeding a monomer for forming the 4-methyl-1-pentene polymer and an organic solvent into a polymerization reactor continuously and extracting a polymerization reaction mixture containing the resulting 4-methyl-1-pentene polymer from the polymerization reactor continuously.

Furthermore, the 4-methyl-1-pentene polymer of the present invention comprises:
50 to 100% by mass of a constituting unit derived from 4-methyl-1-pentene and 0 to 50% by mass of a constituting unit derived from at least one of olefins having 2 to 20 carbon atoms excluding 4-methyl-1-pentene provided that the total of the constituting unit derived from 4-methyl-1-pentene and the constituting unit derived from at least one of olefins having 2 to 20 carbon atoms excluding 4-methyl-1-pentene is 100% by mass, and the 4-methyl-1-pentene polymer satisfies the following formulas (1) and (2):

$$48 \times [Y] - 7500 \leq [X] \leq 48 \times [Y] - 7000 \tag{1}$$

$$160° \text{C.} \leq [Y] \leq 190° \text{C.} \tag{2}$$

provided that in the formulas (1) and (2), [X] is a modulus in tension (MPa), as measured in an ASTM D638 method, of the 4-methyl-1-pentene polymer and [Y] is a Vicat softening point (° C.), as measured in an ASTM D 1525 method, of the 4-methyl-1-pentene polymer.

The 4-methyl-1-pentene polymer is preferably obtainable by feeding a monomer for forming the 4-methyl-1-pentene polymer and an organic solvent continuously to the polymerization reactor and extracting a polymerization reaction mixture containing the resulting 4-methyl-1-pentene polymer from the polymerization reactor continuously.

The 4-methyl-1-pentene polymer according to the present invention is preferably obtainable by further regulating the amount of a solvent-soluble polymer contained in the polymerization reaction mixture extracted from the polymerization reactor to be within 15% by mass.

The 4-methyl-1-pentene polymer preferably comprises:
50 to 99.9% by mass of a constituting unit derived from 4-methyl-1-pentene and 0.1 to 50% by mass of a constituting unit derived from at least one of olefins having 2 to 20 carbon atoms excluding 4-methyl-1-pentene provided that the total of the constituting unit derived from 4-methyl-1-pentene and the constituting unit derived from at least one of olefins having 2 to 20 carbon atoms excluding 4-methyl-1-pentene is 100% by mass.

The process for producing the 4-methyl-1-pentene polymer according to the present invention comprises:
continuously feeding 4-methyl-1-pentene, or 4-methyl-1-pentene and an olefin excluding 4-methyl-1-pentene, together with an organic solvent to a polymerization reactor, and
continuously extracting a polymerization reaction mixture containing a resulting 4-methyl-1-pentene polymer from the polymerization reactor.

It is preferred that the 4-methyl-1-pentene polymer prepared by the above process preferably comprise:
50 to 100% by mass, preferably 50 to 99.9% by mass of a constituting unit derived from 4-methyl-1-pentene and
0 to 50% by mass, preferably 0.1 to 50% by mass of a constituting unit derived from at least one of olefins having 2 to 20 carbon atoms excluding 4-methyl-1-pentene provided that the total of the constituting unit derived from 4-methyl- 1-pentene and the constituting unit derived from at least one of olefins having 2 to 20 carbon atoms excluding 4-methyl-1-pentene is 100% by mass.

In the above process, it is preferred to regulate the amount of a solvent-soluble polymer contained in the polymerization reaction mixture to be within 15% by mass.

The film of the present invention is obtainable from the above-described 4-methyl-1-pentene polymer.

The LED mold of the present invention is obtainable from the above-described 4-methyl-1-pentene polymer.

Effect of the Invention

According to the present invention, the 4-methyl-1-pentene polymer has excellent balance between heat resistance and rigidity and is suitably used for films, LED molds and the like.

BEST EMBODIMENT FOR CARRYING OUT THE INVENTION

The 4-methyl-1-pentene polymer and the process for producing the polymer will be described in detail hereinafter.

4-methyl-1-pentene Polymer

The 4-methyl-1-pentene polymer according to the present invention is obtainable by continuously feeding a monomer for forming the 4-methyl-1-pentene polymer and an organic solvent to a polymerization reactor, and continuously extracting a polymerization reaction mixture containing the 4-methyl-1-pentene polymer from the polymerization reactor.

The monomer for forming the 4-methyl-1-pentene polymer comprises 4-methyl-1-pentene singly, or 4-methyl-1-pentene and at least one of olefins excluding 4-methyl-1-pentene in combination. The 4-methyl-1-pentene polymer produced by such a continuous polymerization method has heat resistance and rigidity simultaneously.

The organic solvent used in the production process according to the present invention is not particularly limited as far as it can feed 4-methyl-1-pentene to the polymerization reactor continuously and can feed a transition metal catalyst component and a co-catalyst component to the polymerization reactor continuously. Specific examples of the organic solvent are aliphatic hydrocarbons, alicyclic hydrocarbons, aromatic hydrocarbons, halogenated hydrocarbons and mixture thereof, preferable examples are aliphatic hydrocarbons, and more preferable examples are a saturated aliphatic hydrocarbon and 4-methyl-1-pentene.

The polymerization reaction mixture used in the present invention is a mixture of the resulting polymer and the organic solvent in a solution state or in a suspension (slurry) state.

The 4-methyl-1-pentene polymer of the present invention is a 4-methyl-1-pentene homopolymer or a copolymer of 4-methyl-1-pentene and an olefin other than 4-methyl-1-pentene, which is a comonomer, particularly, an α-olefin. Examples of the other olefin are α-olefins having 2 to 20 carbon atoms such as ethylene, propylene, 1-butene, 1-hexene, 1-octene and 1-decene, more preferable examples are α-olefins having 3 to 20 carbon atoms, furthermore preferable example are α-olefins having 6 to 20 carbon atoms and particularly preferable examples are α-olefins having 8 to 20 carbon atoms. These olefins may be used singly or two or more may be used in combination. The content of the constituting unit derived from 4-methyl-1-pentene in the 4-methyl-1-pentene polymer is 50 to 100% by mass, preferably 50 to 99.9% by mass, more preferably 80 to 99.9% by mass, particularly preferably 90 to 99.9% by mass based on 100% by mass of the total of the constituting unit of 4-methyl-1-pentene and the constituting unit derived from olefins having 2 to 20 carbon atoms excluding 4-methyl-1-pentene. On the other hand, the content of the constituting unit derived from the other olefins in the 4-methyl-1-pentene polymer is 0 to 50% by mass, preferably 0.1 to 50% by mass, more preferably 0.1 to 20% by mass, particularly preferably 0.1 to 10% by mass based on 100% by mass of the total of the constituting unit of 4-methyl-1-pentene and the constituting unit derived from olefins having 2 to 20 carbon atoms excluding 4-methyl-1-pentene. The contents of the constituting unit derived from 4-methyl-1-pentene and the constituting unit derived from other olefins are determined by $^{13}$C-NMR.

The 4-methyl-1-pentene polymer of the present invention has an intrinsic viscosity [η], as measured in decalin at 135° C. of usually 0.1 to 10 dl/g, preferably 1 to 10 dl/g.

Figure 1:
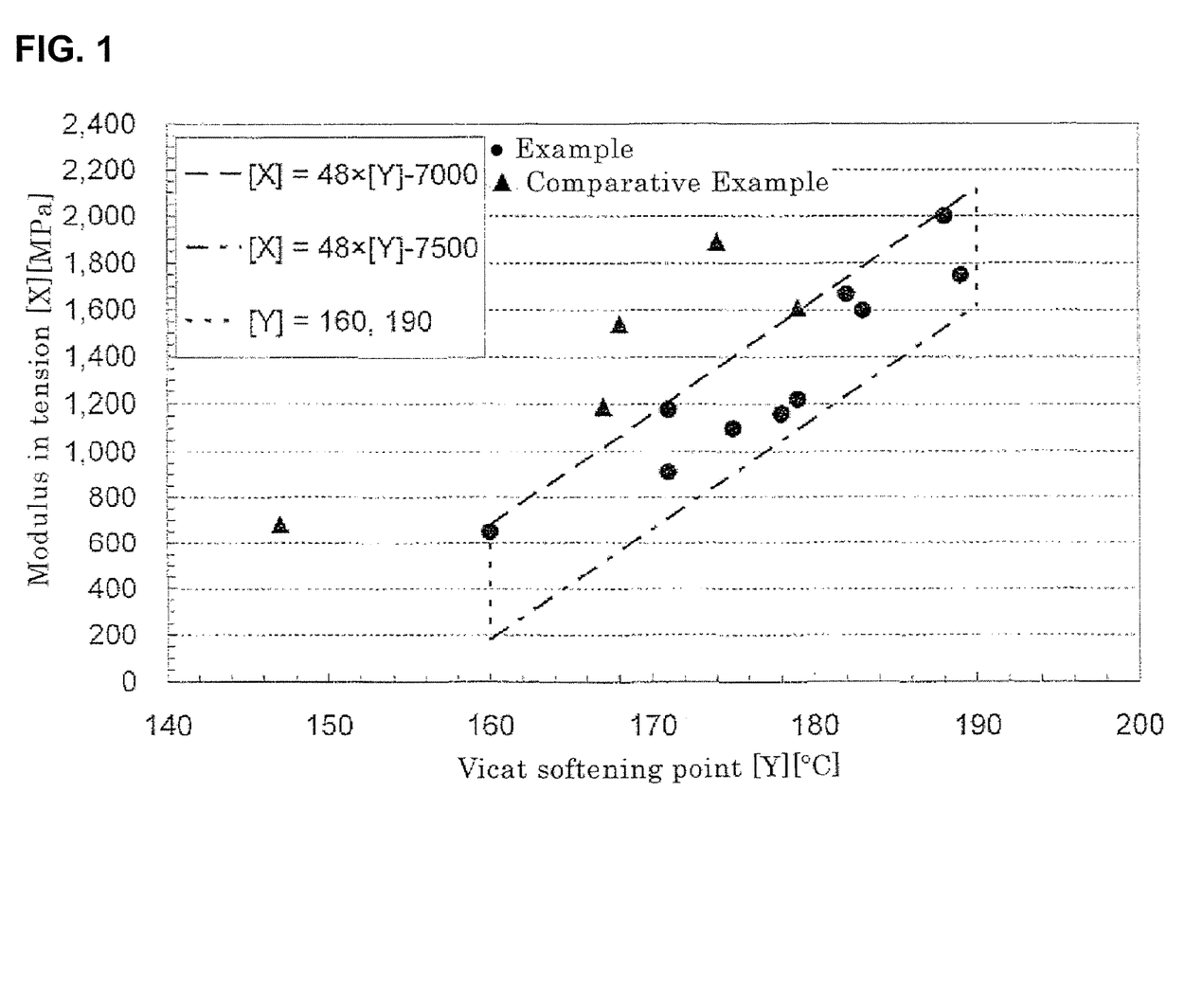
FIG. 1 is a graph showing a relation between a modulus in tension (MPa) and a Vicat softening point (° C.) of a 4-methyl-1-pentene polymer in each of Examples 1 to 10 and Comparative Examples 1 to 5.

The 4-methyl-1-pentene polymer of the present invention simultaneously satisfies the following formulas (1) and (2):

$$48 \times [Y] - 7500 \leq [X] \leq 48 \times [Y] - 7000 \quad (1)$$

$$160° C. \leq [Y] \leq 190° C. \quad (2)$$

In the formulas (1) and (2), [X] is a modulus in tension (MPa), as measured in an ASTM D638 method, of the 4-methyl-1-pentene polymer and [Y] is a Vicat softening point (° C.), as measured in an ASTM D 1525 method, of the 4-methyl-1-pentene polymer.

FIG. 1 shows a relation of [X] and [Y] in the case that the modulus in tension [X] is plotted on a vertical axis and the Vicat softening point [Y] is plotted on a horizontal axis.

The graph of FIG. 1 that intersections of [X] and [Y] are plotted shows that among polymers having the same modulus in tension [X], when a polymer has [Y] plotted in a higher region, it has higher heat resistant with keeping rigidity, while among polymers having the same Vicat softening point [Y] when a polymer has [X] plotted in a lower region, it has low rigidity (flexibility) with keeping heat resistance.

That is to say, the polymer having an intersection of [X] and [Y] in the region shown by the formulas (1) and (2) means a polymer having high heat resistance and low rigidity (flexibility).

The 4-methyl-1-pentene polymer of the present invention satisfies the formulas (1) and (2), and has excellent balance between heat resistance and rigidity. On the other hand, 4-methyl-1-pentene polymers not satisfying the formulas (1) and (2) sometimes have insufficient decrease of wrinkles and shape following properties when used in a mold-releasing film. Although the definite reason why the 4-methyl-1-pentene polymer of the present invention satisfies the formulas (1) and (2) is not revealed, it is supposed as one reason that the composition distribution of comonomers, which are olefins other than 4-methyl-1-pentene, is uniformed. Although the means for equalizing the co-monomer composition distribution is not particularly limited, it is necessary to regulate the comonomer composition distribution by changing the amount of the comonomer fed during the polymerization reaction in the production by a Batch polymerization method because other comonomer components have higher reactivity than 4-methyl-1-pentene and the comonomer content in the resulting polymer changes with time. In the production by a continuous polymerization method, it is supposed that the comonomer content in the resulting polymer does not change with time and the comonomer composition distribution is equalized. Although the process for producing the 4-methyl-1-pentene polymer satisfying the formulas (1) and (2) is not particularly limited, the continuous polymerization method is preferable.

The 4-methyl-1-pentene polymer of the present invention is obtainable by feeding the monomer for forming the 4-methyl-1-pentene polymer and the organic solvent continuously into the polymerization reactor and extracting a polymerization reaction mixture from the polymerization reactor continuously. In the preparation, it is preferred that the amount of a solvent-soluble polymer contained in the polymerization reaction mixture be regulated to not more than 25% by mass, preferably 0 to 20% by mass, more preferably 0 to 15% by mass. The amount of the solvent-soluble polymer contained in the polymerization reaction mixture is preferably in the above range, because the continuous extraction of the polymerization reaction mixture from the polymerization reactor is stable.

The solvent-soluble polymer is a polymer component having a low molecular weight and a low stereoregularity, which is dissolved in the organic solvent and obtainable by evaporating the slurry filtrate, of the 4-methyl-1-pentene polymer contained in the polymerization reaction mixture in the polymerization reactor in the suspension polymerization method (slurry polymerization method). The amount (% by mass) of the solvent-soluble polymer is determined by the following formula.

Amount of solvent-soluble polymer=Resultant amount of Solvent-soluble polymer/(Resultant amount of Polymer+Resultant amount of Solvent-soluble polymer)×100

For decreasing the resultant amount of the solvent-soluble polymer, it is effective to add the electron donor contained in the transition metal catalyst components as described later to the polymerization reactor because the stereoregularity of the polymer is improved and the solubility in the solvent is decreased.

[Process for Producing the 4-methyl-1-pentene Polymer]

The process for producing the 4-methyl-1-pentene polymer according to the present invention comprises continuously feeding the monomer for forming the 4-methyl-1-pentene polymer together with the organic solvent to the polymerization reactor, and continuously extracting the polymerization reaction mixture containing the resulting 4-methyl-1-pentene polymer from the polymerization reactor.

In the process for producing the 4-methyl-1-pentene polymer according to the present invention, the polymerization catalyst containing the transition metal catalyst component and the co-catalyst component is continuously fed to the polymerization reactor in addition to the organic solvent and the monomer for forming the 4-methyl-1-pentene polymer.

Examples of the transition metal catalyst for constituting the transition metal catalyst component may include a solid titanium catalyst and a metallocene catalyst, which comprise magnesium, titanium, halogen and an electron donor. Of these, the solid titanium catalyst is preferred. Particularly, the titanium catalyst containing titanium, magnesium, halogen and a compound having plural ether bonds, which catalyst is obtainable by allowing a magnesium compound suspended in an inert hydrocarbon solvent to contact with a compound having at least two ether bonds through plural atoms as an electron donor and a titanium compound in a liquid state. Examples of the inert hydrocarbon solvent are hexane, decane and dodecene. Examples of the electron donor may include 2-isobutyl-2-isopropyl-1,3-dimethoxypropane and 2-isopentyl-2-isopropyl-1,3-dimethoxypropane which are compounds having at least two ether bonds through plural atoms. Examples of the magnesium compound are anhydrous magnesium chloride and methoxy magnesium chloride. The above solid titanium catalyst has an atomic ratio of halogen to titanium (halogen/titanium) of usually from 2 to 100, preferably 4 to 90, a molar ratio of the compound containing at least two ether bonds to titanium (the compound containing at least two ether bonds/titanium) of usually from 0.01 to 100, preferably 0.2 to 10, and an atomic ratio of magnesium to titanium (magnesium/titanium) of usually from 2 to 100, preferably 4 to 50.

Examples of the co-catalyst component (organometal compound catalyst component) may include organoaluminum compounds, for examples, organoaluminum compounds represented by $R^a{}_n AlX_{3-n}$. In $R^a{}_n AlX_{3-n}$, $R^a$ is a hydrocarbon group having 1 to 12 carbon atoms, for example, an alkyl group, a cycloalkyl group or an aryl group, specifically, methyl group, ethyl group, n-propyl group, isopropyl group, isobutyl group, pentyl group, hexyl group, octyl group, cyclopentyl group, cyclohexyl group, phenyl group and tolyl group. X is halogen or hydrogen. N is any one of 1 to 3.

Specific examples of the organoaluminum compounds represented by $R^a{}_n AlX_{3-n}$ are trialkyl aluminums such as trimethyl aluminum, triethyl aluminum, triisopropyl aluminum, triisobutyl aluminum, trioctyl aluminum and tri-2-ethylhexyl aluminum;

alkenyl aluminums such as isoprenyl aluminum and the like;

dialkyl aluminum halides such as dimethyl aluminum chloride, diethyl aluminum chloride, diisopropyl aluminum chloride, diisobutyl aluminum chloride and dimethyl aluminum bromide;

alkyl aluminum, sesquihalides such as methyl aluminum sesquichloride, ethyl aluminum sesquichloride, isopropyl aluminum sesquichloride, butyl aluminum sesquichloride and ethyl aluminum sesquibromide;

alkyl aluminum dihalides such as methyl aluminum dichloride, ethyl aluminum dichloride, isopropyl aluminum dichloride and ethyl aluminum dibromide; and alkyl aluminum hydrides such as diethyl aluminum hydride and diisobutyl aluminum hydride. Of these, alkyl aluminums such as triethyl aluminum and triisobutyl aluminum are preferred.

When the transition metal catalyst component is a solid titanium catalyst component, the co-catalyst component (organometal compound catalyst component) may be used in an amount such that the polymer is produced in an amount of usually from 0.1 to 1,000,000 g, preferably 100 to 1,000,000 per 1 g of the solid titanium catalyst component, and it is used in an amount of usually 0.1 to 1,000 mol, preferably about 0.5 to 500 mol, more preferably 1 to 200 mol per 1 mol of titanium atom in the solid titanium catalyst component.

The transition metal catalyst component is preferably fed in a state suspended in an inert organic solvent (preferably saturated aliphatic hydrocarbon) to the polymerization reactor.

The transition metal catalyst component is preferably used in a solid catalyst component state that it is pre-polymerized with an α-olefin such as 3-methyl-1-pentene or 4-methyl-1-pentene.

In the pre-polymerization, the above α-olefin is polymerized in an amount of usually 0.1 to 1000 g, preferably 0.3 to 500 g, more preferably 1 to 200 g per 1 g of the transition metal catalyst component. The pre-polymerization, moreover, can be carried out in a catalyst concentration higher than the catalyst concentration of the reaction system in the polymerization of 4-methyl-1-pentene.

In the production of the 4-methyl-1-pentene polymer according to the present invention, a liquid phase polymerization process such as solution polymerization or suspension polymerization (slurry polymerization) is employed. It is preferred to employ the suspension polymerization (slurry polymerization).

The 4-methyl-1-pentene polymer of the present invention is produced by continuously polymerizing the monomer for forming 4-methyl-1-pentene polymer.

In the continuous polymerization, the polymer concentration in the liquid phase is usually from 10 to 300 g/L, preferably 50 to 300 g/L.

In the continuous polymerization, the catalyst concentration in the liquid phase as the transition metal catalyst component is usually 0.00001 to 1 mmol/L, preferably 0.0001 to 1 mmol/L.

In the continuous polymerization, the polymerization temperature is usually from 0 to 80° C., preferably 20 to 80° C. When the polymerization temperature is higher than the above range, the solubility is increased and thereby the resultant amount of the solvent-soluble polymer is too much increased. In results, the continuous extraction of the polymerization reaction mixture from the polymerization reactor becomes instable and the product yield is occasionally lowered. On the other hand, when the polymerization temperature is lower than the above range, the progress of the polymerization reaction occasionally becomes insufficient.

In the continuous polymerization, the pressure of the gas phase part in the polymerization reactor is usually 1 to 10 kg/cm$^2$.

In the continuous polymerization, hydrogen may be continuously introduced into the polymerization reactor. The continuous introduction of hydrogen to the polymerization reactor can regulate the molecular weight of the polymer, and thereby for example, a 4-methyl-1-pentene polymer having a low intrinsic viscosity [$\eta$] can be prepared.

As the polymerization reactor, a loop type polymerization reactor or a stirring vessel type polymerization reactor is used. It is preferred to use the stirring vessel type one. Furthermore, the polymerization reactors are classified into a liquid filling type and a gas-liquid separation type. It is preferred to use the gas-liquid separation type on the point of molecular weight control.

As a method for removing heat in the polymerization reactor, there are a sensible heat removing type and a gas latent heat removing type. It is preferred to use the sensible heat removing type.

As a method for continuously extracting the polymerization reaction mixture from the polymerization reactor, there are pressure extracting and pump extracting.

The polymerization reaction mixture is extracted continuously from the lower part of the polymerization reactor. The extracting is regulated in such a rate that the average retention time is usually from 0.1 to 10 hr, preferably 0.1 to 8 hr.

[Use]

The film formed from the 4-methyl-1-pentene polymer according to the present invention has more excellent heat resistance and rigidity simultaneously as compared with films formed from a 4-methyl-1-pentene polymer produced by a conventional batch method.

The film can be produced by known methods such as an extrusion molding method using a T die device, a heat press method or a solvent casting method. The extrusion molding method using the T die device is excellent because it can easily produce films uniformly and can produce films of great width. For example, when a single layer film of the 4-methyl-1-pentene polymer is produced using an extrusion molding machine equipped with a single layer T die, extrusion molding is carried out by setting the temperatures of the extrusion machine and the T die in the range of 260 to 330° C.

The 4-methyl-1-pentene polymer of the present invention, moreover, is suitably used for LED molds (molded member of a light emitting diode).

EXAMPLE

The present invention will be described with reference to the following examples in more detail hereinafter, but it should not be limited by these examples.

[Methods for Evaluating the 4-methyl-1-pentene Polymer]

With respect to the 4-methyl-1-pentene polymer of the present invention, the modulus in tension and the Vicat softening point were measured in the following methods.

(i) Tensile test (MPa): ASTM D638 (Test piece IV; 2 mm thick)

(ii) Vicat softening point (° C.): ASTM D1525 (Test piece; 3 mm thick)

(iii) $^{13}$C-NMR measurement

NMR measuring device: Mercury 400 type manufactured by Varian

Solvent: deuterated benzene/ortho-dichlorobenzene mixed solvent

Sample concentration: 50 to 100 g/1-solvent

Measuring conditions: Pulse repeating time; 5.5 sec, number of scans; 16000 times and measuring temperature; 120° C.

The integral value of each peak in the $^{13}$C-NMR spectrum measured in the above conditions was determined, and the content (mol %) on the basis of mole of the constituting unit derived from each α-olefin except for 4-methyl-1-pentene in the 4-methyl-1-pentene polymer was determined by the following formula. Furthermore, the resultant content on the basis of mole and the molecular weight of α-olefin, which is each constituting unit, the content (% by mass) on the basis of mass was determined. P1 (near 46 ppm): Methylene in the side chain of 4-methyl-1-pentene P2 (near 35 ppm): Methylene carbon in the side chain of α-olefin except for 4-methyl-1-pentene directly bonded to the main chain methylene $$\text{Content(\% by mole) of α-olefin except for 4-methyl-1-pentene} = [P2/(P1+P2)] \times 100$$

(iv) Intrinsic Viscosity [$\eta$] (135° C., Decalin)

The intrinsic viscosity [$\eta$] is a value measured at 135° C. in a decalin solvent. That is to say, about 20 mg of a polymer was dissolved in 15 ml of decalin and the specific viscosity $\eta$ sp was measured in an oil bath at 135° C. To this decalin solution, 5 ml of the decalin solvent was added and dissolved, and then the specific viscosity $\eta$ sp was measured in the same manner. This dilution procedure was further repeated twice and the $\eta$ sp/C value determined by the extrapolation of the concentration (C) to 0 was taken as the intrinsic viscosity ([$\eta$]=lim($\eta$ sp/C) (C→0)).

Preparation Example 1

Preparation of Solid Titanium Catalyst Component

After 75 g of anhydrous magnesium chloride, 280.3 g of decane and 308.3 g of 2-ethylhexyl alcohol were reacted with heat at 130° C. for 3 hr to prepare an uniform solution, 22.2 ml of 2-isobutyl-2-isopropyl-1,3-dimethoxypropane was added to this solution and mixed with stirring at 100° C. for 1 hr.

After cooling the resultant uniform solution to room temperature, 30 ml of this uniform solution was dropped all with stirring to 80 ml of titanium tetrachloride kept at −20° C. over 45 min. After completion of the dropping, the mixed solution was heated to 110° C. over 4.5 hr. When the temperature reached 110° C., 0.52 ml of 2-isobutyl-2-isopropyl-1,3-dimethoxypropane was added to the mixed solution and then stirred at the same temperature for 2 hr. After completion of the two-hour reaction, a solid part was collected by hot filtration. The solid part was suspended again in 100 ml of titanium tetrachloride and reacted with heat at 110° C. for 2 hr. After completion of the reaction, a solid part was collected again by hot filtration. The solid part was washed sufficiently by decane and hexane at 90° C. until liberated titanium compounds were not detected. The resultant solid titanium catalyst component was kept as a decane slurry.

A part of the decane slurry of the solid titanium catalyst component was dried and examined on the catalyst composition. With regard to the catalyst composition of the solid titanium catalyst component, titanium was 3.0% by mass, magnesium was 17.0% by mass, chlorine was 57% by mass, 2-isobutyl-2-isopropyl-1,3-dimethoxypropane was 18.8% by mass and 2-ethylhexyl alcohol was 1.3% by mass.

Preparation Example 2

Pre-Polymerization of Solid Titanium Catalyst Component

To 200 ml four-neck glass reactor equipped with a stirrer, 8.36 ml of dried decane and 1.66 ml (1.0 mol/l in terms of aluminum atom) of a decane solution of triethyl aluminum were fed under a dried nitrogen stream. Subsequently, 26.5 ml (0.83 mmol in terms of titanium atom, containing 1.3 g in terms of mass of the solid titanium catalyst component) of the decane slurry of the solid titanium catalyst component prepared in Preparation Example 1 and 4.98 ml (3.3 g) of 3-methyl-1-pentene were added with stirring at 20° C. Thereafter, the mixture was kept with stirring at 20° C. for 45 min to prepare the pre-polymerization catalyst.

In the pre-polymerization catalyst, 2.5 g of the polymer was contained per 1 g of the solid titanium catalyst component.

Example 1

Using a 200 L internal volume stainless steel polymerization reactor equipped with a stirrer, polymerization of 4-methyl-1-pentene was carried out continuously.

To the polymerization reactor, 4-methyl-1-pentene in an amount of 50 L/hr, 1-decene as other α-olefin in an amount of 0.3 L/hr, triethylaluminum in an amount of 100 mmol/hr, hydrogen in an amount of 50 NL/hr, the decane slurry of the pre-polymerization catalyst prepared in Preparation Example 2 in an amount in terms of a solid titanium catalyst component of 2 g/hr and 2-isobutyl-2-isopropyl-1,3-dimethoxypropane in an amount of 50 mmol/hr were added and continuous polymerization of 4-methyl-1-pentene was carried out at a polymerization temperature of 40° C. for an average retention time of about 2 hours. The polymerization slurry was continuously extracted from the lower part of the polymerization reactor, filtered off, dried and then granulated by an extruder.

A 4-methyl-1-pentene polymer was prepared in an amount of 9.2 kg/hr.

The evaluation results on the 4-methyl-1-pentene polymer are shown in Table 1.

Example 2

The procedure of Example 1 was repeated except that the other α-olefin was added in an amount of 0.6 L/hr in place of 0.3 L/hr, to carry out continuous polymerization.

The results are shown in Table 1.

Example 3

The procedure of Example 1 was repeated except that the other α-olefin was not used, to carry out continuous polymerization.

The results are shown in Table 1.

Example 4

The procedure of Example 3 was repeated except that the polymerization temperature was changed to 30° C. in place of 40° C., to carry out continuous polymerization.

The results are shown in Table 1.

Example 5

The procedure of Example 1 was repeated except that 1-octadecene was used as other α-olefin in place of 1-decene, the other α-olefin was used in an amount of 0.7 L/hr in place of 0.3 L/hr and the polymerization temperature was changed to 30° C. in place of 40° C., to carry out continuous polymerization.

The results are shown in Table 1.

Example 6

The procedure of Example 5 was repeated except that the other α-olefin was used in an amount of 1.0 L/hr in place of 0.7 L/hr, to carry out continuous polymerization.

The results are shown in Table 2.

Example 7

The procedure of Example 5 was repeated except that the other α-olefin was used in an amount of 1.3 L/hr in place of 0.7 L/hr, to carry out continuous polymerization.

The results are shown in Table 2.

Example 8

The procedure of Example 1 was repeated except that 1-octadecene was used as the other α-olefin in place of 1-decene and the other α-olefin was used in an amount of 0.7 L/hr in place of 0.3 L/hr, to carry out continuous polymerization.

The results are shown in Table 2.

Example 9

The procedure of Example 8 was repeated except that the other α-olefin was used in an amount of 1.0 L/hr in place of 0.7 L/hr, to carry out continuous polymerization.

The results are shown in Table 2.

Example 10

The procedure of Example 8 was repeated except that the other α-olefin was used in an amount of 1.3 L/hr in place of 0.7 L/hr, to carry out continuous polymerization.

The results are shown in Table 2.

TABLE 1

| Example | Unit | 1 | 2 | 3 | 4 | 5 |
|---|---|---|---|---|---|---|
| Polymerization condition | | | | | | |
| Polymerization method | | Continuous | Continuous | Continuous | Continuous | Continuous |
| 4-methyl-1-pentene | L/h | 50 | 50 | 50 | 50 | 50 |
| Other α-olefin | Kind | 1-decene | 1-decene | None | None | 1-octadecene |
|  | L/h | 0.3 | 0.6 | | | 0.7 |
| Solid titanium catalyst component | Kind | Prepolymerization catalyst | Prepolymerization catalyst | Prepolymerization catalyst | Prepolymerization catalyst | Prepolymerization catalyst |
|  | G/h | 2 | 2 | 2 | 2 | 2 |
| Triethyl aluminum | mmol/h | 100 | 100 | 100 | 100 | 100 |
| Electron donor | Kind | * | * | * | * | * |
|  | mmol/h | 50 | 50 | 50 | 50 | 50 |
| Hydrogen | NL/h | 50 | 50 | 50 | 50 | 50 |
| Polymerization temperature | °C. | 40 | 40 | 40 | 30 | 30 |
| Average retention time | h | 2 | 2 | 2 | 2 | 2 |
| Polymerization result | | | | | | |
| Amount of polymer generated | kg/h | 9.2 | 9.5 | 8.8 | 8.8 | 9.2 |
| Amount of solvent-soluble polymer | Mass % | 1.8 | 2.3 | 1.6 | 0.1 | 2.0 |
| Content of other α-olefin | Mass % | 2.1 | 3.5 | | | 2.2 |
| [η] | DL/g | 3.1 | 3.1 | 3.0 | 3.0 | 3.1 |
| Modulus in tension [X] | MPa | 1670 | 1180 | 1750 | 2000 | 1160 |
| Vicat softening point [Y] | °C. | 182 | 171 | 189 | 188 | 178 |
| 48 × [Y] − 7000 | | 1736 | 1208 | 2072 | 2024 | 1544 |
| 48 × [Y] − 7500 | | 1236 | 708 | 1572 | 1524 | 1044 |

* 2-isobutyl-2-isopropyl-1,3-dimethoxypropane

TABLE 2

| Example | Unit | 6 | 7 | 8 | 9 | 10 |
|---|---|---|---|---|---|---|
| Polymerization condition | | | | | | |
| Polymerization method | | Continuous | Continuous | Continuous | Continuous | Continuous |
| 4-methyl-1-pentene | L/h | 50 | 50 | 50 | 50 | 50 |
| Other α-olefin | Kind | 1-octadecene | 1-octadecene | 1-octadecene | 1-octadecene | 1-octadecene |
|  | L/h | 1.0 | 1.3 | 0.7 | 1.0 | 1.3 |
| Solid titanium catalyst component | Kind | Prepolymerization catalyst | Prepolymerization catalyst | Prepolymerization catalyst | Prepolymerization catalyst | Prepolymerization catalyst |
|  | g/h | 2 | 2 | 2 | 2 | 2 |
| Triethyl aluminum | mmol/h | 100 | 100 | 100 | 100 | 100 |
| Electron donor | Kind | * | * | * | * | * |
|  | mmol/h | 50 | 50 | 50 | 50 | 50 |
| Hydrogen | NL/h | 50 | 50 | 50 | 50 | 50 |
| Polymerization temperature | °C. | 30 | 30 | 40 | 40 | 40 |
| Average retention time | h | 2 | 2 | 2 | 2 | 2 |
| Polymerization result | | | | | | |
| Amount of polymer generated | kg/h | 9.5 | 9.3 | 9.5 | 9.7 | 9.5 |

TABLE 2-continued

| Example | Unit | 6 | 7 | 8 | 9 | 10 |
|---|---|---|---|---|---|---|
| Amount of solvent-soluble polymer | mass % | 1.0 | 9.7 | 2.5 | 4.3 | 7.9 |
| Content of other α-olefin | mass % | 2.8 | 4.4 | 2.2 | 3.0 | 3.8 |
| [η] | dL/g | 3.4 | 3.2 | 3.4 | 3.3 | 3.7 |
| Modulus in tension [X] | MPa | 910 | 650 | 1600 | 1220 | 1100 |
| Vicat softening point [Y] | ° C. | 171 | 160 | 183 | 179 | 175 |
| 48 × [Y] − 7000 | | | 1208 | 680 | 1784 | 1592 | 1400 |
| 48 × [Y] − 7500 | | | 708 | 180 | 1284 | 1092 | 900 |

* 2-isobutyl-2-isopropyl-1,3-dimethoxypropane

Comparative Example 1

Using a 200 L internal volume stainless steel polymerization reactor equipped with a stirrer, batch polymerization of 4-methyl-1-pentene was carried out.

To the polymerization reactor, 4-methyl-1-pentene in an amount of 100 L, 1-decene as other α-olefin in an amount of 1.0 L, triethylaluminum in an amount of 100 mmol, hydrogen in an amount of 50 NL, the hexane slurry of the pre-polymerization catalyst prepared in Preparation Example 2 in an amount in terms of a solid titanium catalyst component of 2 g and 2-isobutyl-2-isopropyl-1,3-dimethoxypropane in an amount of 50 mmol were added and batch polymerization of 4-methyl-1-pentene was carried out at a polymerization temperature of 40° C. After 4 hours from the start of the reaction, the polymerization slurry was extracted from the polymerization reactor, filtered off, dried and then granulated by an extruder.

A 4-methyl-1-pentene polymer was prepared in an amount of 15.0 kg.

The polymerization conditions and the evaluation results on the 4-methyl-1-pentene polymer are shown in Table 3.

Comparative Example 2

The procedure of Comparative Example 1 was repeated except that the other α-olefin was not used, to carry out batch polymerization.

The results are shown in Table 3.

Comparative Example 3

The procedure of Comparative Example 1 was repeated except that 1-octadecene was used as the other α-olefin in place of 1-decene and the other α-olefin was used in an amount of 1.6 L in place of 1.0 L, to carry out batch polymerization.

The results are shown in Table 3.

Comparative Example 4

The procedure of Comparative Example 3 was repeated except that the other α-olefin was used in an amount of 4.5 L in place of 1.6 L, to carry out batch polymerization of 4-methyl-1-pentene.

The results are shown in Table 3.

Comparative Example 5

The procedure of Comparative Example 3 was repeated except that the other α-olefin was used in an amount of 9.1 L in place of 1.6 L, to carry out batch polymerization of 4-methyl-1-pentene.

The results are shown in Table 3.

The 4-methyl-1-pentene polymers prepared by the batch polymerization in Comparative Examples 1 to 5 do not satisfy the formulas (1) and (2) simultaneously and it is found that they have inferior balance between heat resistance and rigidity as compared with the 4-methyl-1-pentene polymers prepared by the continuous polymerization in Examples 1 to 10.

Comparative Example 6

The procedure of Example 10 was repeated except that the polymerization was 45° C. in place of 40° C., to carry out continuous polymerization.

A 4-methyl-1-pentene polymer was prepared in an amount of 9.3 kg/hr and the amount of a solvent-soluble polymer was 16.4% by mass.

Comparative Example 7

The procedure of Example 10 was repeated except that an electron donor was not used, to carry out continuous polymerization.

A 4-methyl-1-pentene polymer was prepared in an amount of 9.2 kg/hr and the amount of a solvent-soluble polymer was 16.9% by mass.

In Comparative Examples 6 and 7, continuous extraction of the polymerization reaction mixture from the polymerization reactor could not be carried out stably.

TABLE 3

| Comparative Example | Unit | 1 | 2 | 3 | 4 | 5 |
|---|---|---|---|---|---|---|
| Polymerization condition | | | | | | |
| Polymerization method | | Batch | Batch | Batch | Batch | Batch |
| 4-methyl-1-pentene | L | 100 | 100 | 100 | 100 | 100 |
| Other α-olefin | Kind | 1-decene | None | 1-octadecene | 1-octadecene | 1-octadecene |
| | L | 1.0 | — | 1.6 | 4.5 | 9.1 |

TABLE 3-continued

| Comparative Example | Unit | 1 | 2 | 3 | 4 | 5 |
|---|---|---|---|---|---|---|
| Solid titanium catalyst component | Kind | Pre-polymerization catalyst | Pre-polymerization catalyst | Pre-polymerization catalyst | Pre-polymerization catalyst | Pre-polymerization catalyst |
| | g | 2 | 2 | 2 | 2 | 2 |
| Triethyl aluminum | mmol | 100 | 100 | 100 | 100 | 100 |
| Electron donor | Kind | * | * | * | * | * |
| | mmol/h | 50 | 50 | 50 | 50 | 50 |
| Hydrogen | NL | 50 | 50 | 50 | 50 | 50 |
| Polymerization temperature | ° C. | 40 | 40 | 40 | 40 | 40 |
| Polymerization time | h | 4 | 4 | 4 | 4 | 4 |
| Polymerization result | | | | | | |
| Amount of polymer generated | kg | 15.0 | 14.5 | 14.8 | 15.0 | 14.5 |
| Amount of solvent-soluble polymer | Mass % | 4.2 | 0.1 | 2.7 | 2.8 | 16.1 |
| Content of other α-olefin | Mass % | 3.4 | — | 1.4 | 3.6 | 6.1 |
| [η] | dL/g | 3.2 | 3.0 | 3.0 | 3.0 | 3.0 |
| Modulus in tension [X] | MPa | 1540 | 1890 | 1610 | 1190 | 680 |
| Vicat softening point [Y] | ° C. | 168 | 174 | 179 | 167 | 147 |
| 48 × [Y] − 7000 | | 1064 | 1352 | 1592 | 1016 | 56 |
| 48 × [Y] − 7500 | | 564 | 852 | 1092 | 516 | −444 |

* 2-isobutyl-2-isopropyl-1,3-dimethoxypropane

Example 11

Using a T die extrusion molding machine (30 mm Ø, L/D=26, C1/C2/C3/C4/A1/A2/D1/D2=300/310/310/310/310/310/310/310, screw rotating speed of 60 rpm) manufactured by Thermo-Plastics Industries Co. Ltd, a single layer film having a width of 130 mm and a thickness of 50 μm was prepared using the 4-methyl-1-pentene polymer prepared in Example 1. The production of the single layer film was carried out in the conditions that the chill roll temperature was 60° C. and the film drawing rate was 7 m/min.

The film prepared had excellent heat resistance and softness simultaneously and also had excellent transparency.

INDUSTRIAL APPLICABILITY

The 4-methyl-1-pentene polymer of the present invention has excellent balance between heat resistance and rigidity and, moreover, has excellent processability, chemical resistance and electric and mechanical properties. Therefore, it is processed into extrusion molded articles, injection molded articles, hollow molded articles, films and sheets and then favorably applied to various uses, for example, convenience goods, kitchen utensils, packaging films, fibers such as non-woven fabrics and the like, household electric appliances, mechanical parts, electric parts, automobile parts and the like.

The invention claimed is:

1. A 4-methyl-1-pentene polymer comprising:
50 to 100% by mass of a constituting unit derived from 4-methyl-1-pentene and 0 to 50% by mass of a constituting unit derived from at least one of olefins having 2 to 20 carbon atoms excluding 4-methyl-1-pentene provided that the total of the constituting unit derived from 4-methyl-1-pentene and the constituting unit derived from at least one of olefins having 2 to 20 carbon atoms excluding 4-methyl-1-pentene is 100% by mass, wherein the 4-methyl-1-pentene polymer satisfies the following formulas (1) and (2):

$$48 \times [Y] - 7500 \leq [X] \leq 48 \times [Y] - 7000 \quad (1)$$

$$160° C. \leq [Y] \leq 190° C. \quad (2)$$

in which [X] is a modulus in tension (MPa), as measured in an ASTM D638 method, of the 4-methyl-1-pentene polymer and [Y] is a Vicat softening point (° C.), as measured in an ASTM D 1525 method, of the 4-methyl-1-pentene polymer.

2. The 4-methyl-1-pentene polymer according to claim 1 which is obtained by continuously feeding a monomer for forming the 4-methyl-1-pentene polymer and an organic solvent to a polymerization reactor and continuously extracting a polymerization reaction mixture containing the resulting 4-methyl-1-pentene polymer from the polymerization reactor.

3. A process for producing a 4-methyl-1-pentene polymer which process comprises:
continuously feeding 4-methyl-1-pentene, or 4-methyl-1-pentene and an olefin excluding 4-methyl-1-pentene, together with an organic solvent to a polymerization reactor, and
continuously extracting a polymerization reaction mixture containing a resulting 4-methyl-1-pentene polymer from the polymerization reactor wherein the 4-methyl-1-pentene polymer comprises:
50 to 100% by mass of a constituting unit derived from 4-methyl-1-pentene and
0 to 50% by mass of a constituting unit derived from at least one of olefins having 2 to 20 carbon atoms excluding 4-methyl-1-pentene provided that the total of the constituting unit derived from 4-methyl-1-pentene and the constituting unit derived from at least one of olefins having 2 to 20 carbon atoms excluding 4-methyl-1-pentene is 100% by mass, and the 4-methyl-1-pentene polymer satisfies the following formulas (1) and (2):

$$48\times[Y]-7500 \leqq [X] \leqq 48\times[Y]-7000 \quad (1)$$

$$160°\,C. \leqq [Y] \leqq 190°\,C. \quad (2)$$

in which [X] is a modulus in tension (MPa), as measured in an ASTM D638 method, of the 4-methyl-1-pentene polymer and [Y] is a Vicat softening point (° C.), as measured in an ASTM D 1525 method, of the 4-methyl-1-pentene polymer.

4. The process for producing a 4-methyl-1-pentene polymer according to claim 3 wherein the 4-methyl-1-pentene polymer comprises:
    50 to 99.9% by mass of a constituting unit derived from 4-methyl-1-pentene and
    0.1 to 50% by mass of a constituting unit derived from at least one of olefins having 2 to 20 carbon atoms excluding 4-methyl-1-pentene provided that the total of the constituting unit derived from 4-methyl-1-pentene and the constituting unit derived from at least one of olefins having 2 to 20 carbon atoms excluding 4-methyl-1-pentene is 100% by mass.

5. The process for producing a 4-methyl-1-pentene polymer according to claim 3, which further comprises regulating the amount of a solvent-soluble polymer, which is contained in the polymerization reaction mixture to be 15% by mass or less.

6. The 4-methyl-1-pentene polymer according to claim 2 which is obtained by further regulating the amount of a solvent-soluble polymer which is contained in the polymerization reaction mixture to be 15% by mass or less.

7. The 4-methyl-1-pentene polymer according to claim 1 comprising:
    50 to 99.9% by mass of a constituting unit derived from 4-methyl-1-pentene and 0.1 to 50% by mass of a constituting unit derived from at least one of olefins having 2 to 20 carbon atoms excluding 4-methyl-1-pentene provided that the total of the constituting unit derived from 4-methyl-1-pentene and the constituting unit derived from at least one of olefins having 2 to 20 carbon atoms excluding 4-methyl-1-pentene is 100% by mass.

8. A film comprising the 4-methyl-1-pentene polymer according to claim 1.

9. An LED mold comprising the 4-methyl-1-pentene polymer according to claim 1.

* * * * *